United States Patent
Avery et al.

(10) Patent No.: US 8,673,206 B2
(45) Date of Patent: Mar. 18, 2014

(54) METHODS OF EXTRUDING A HONEYCOMB BODY

(75) Inventors: James Frederick Avery, Horseheads, NY (US); Ronald Alan Boyko, Elmira, NY (US); Daniel Wayne Corbett, Himrod, NY (US); Christopher John Malarkey, Corning, NY (US); Kenneth Charles Sariego, Beaver Dams, NY (US); David Robertson Treacy, Jr., Horseheads, NY (US)

(73) Assignee: Corning Incorporated, Corning, NY (US)

( * ) Notice: Subject to any disclaimer, the term of this patent is extended or adjusted under 35 U.S.C. 154(b) by 548 days.

(21) Appl. No.: 12/953,834

(22) Filed: Nov. 24, 2010

(65) Prior Publication Data

US 2011/0291319 A1  Dec. 1, 2011

Related U.S. Application Data

(60) Provisional application No. 61/265,105, filed on Nov. 30, 2009.

(51) Int. Cl.
*B28B 3/20* (2006.01)

(52) U.S. Cl.
USPC .......................................... 264/630; 264/631

(58) Field of Classification Search
USPC ............................................... 264/630, 631
See application file for complete search history.

(56) References Cited

U.S. PATENT DOCUMENTS

| | | | |
|---|---|---|---|
| 2,661,497 A | 12/1953 | Birmingham | 18/12 |
| 2,786,504 A | 3/1957 | Samler | 146/174 |
| 3,962,092 A | 6/1976 | Newman, Jr. | 210/236 |
| 3,983,038 A | 9/1976 | Heston | 210/447 |
| 4,025,434 A | 5/1977 | Mladota | 210/236 |
| 4,915,612 A * | 4/1990 | Gangeme et al. | 425/464 |
| 5,417,866 A | 5/1995 | Trott | 210/791 |
| 5,525,291 A * | 6/1996 | St. Julien | 419/41 |
| 5,811,048 A * | 9/1998 | Dunn et al. | 264/177.11 |
| 6,562,284 B2 | 5/2003 | Beall et al. | 264/631 |
| 7,276,194 B2 * | 10/2007 | Shalkey | 264/177.12 |
| 8,382,464 B2 * | 2/2013 | Keller et al. | 425/192 R |
| 2008/0113190 A1 * | 5/2008 | Keller et al. | 428/339 |

* cited by examiner

*Primary Examiner* — Joseph S Del Sole
*Assistant Examiner* — Russell Kemmerle, III
(74) *Attorney, Agent, or Firm* — Matthew B. McNutt

(57) ABSTRACT

Methods of extruding a honeycomb body with an extruder comprise the step of feeding batch material to the extruder, wherein the batch material comprises a ceramic or ceramic-forming material. The methods further include the step of rotating at least one mixing screw to cause the batch material to travel along a flow path defined by a barrel of the extruder. The methods further include the step of indexing a carriage to remove a first device from the flow path and introduce a second device into the flow path of the batch material. In one example, the pressure of the batch material changes less than about 25% as a result of indexing the carriage. In addition or alternatively, further methods include the step of reducing a decrease in temperature of the batch material resulting from the step of indexing. In further examples, the method includes the step of pre-filling a second honeycomb extrusion die held by the carriage with a plugging material.

15 Claims, 6 Drawing Sheets

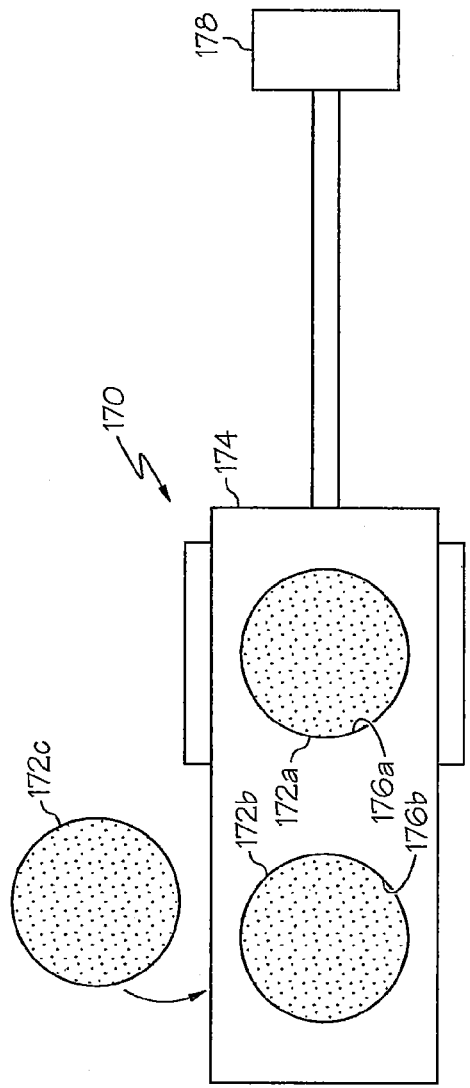
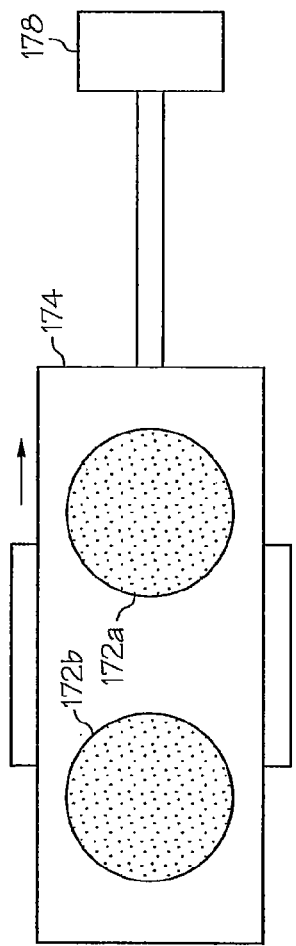
FIG. 4A
FIG. 4B

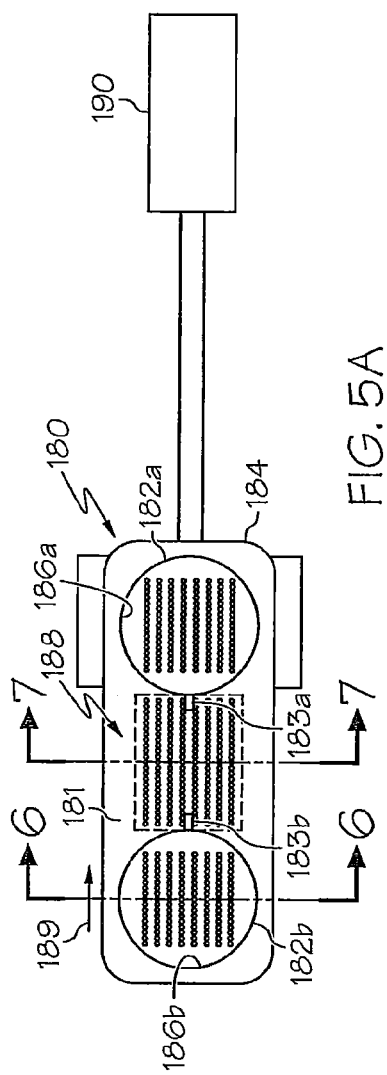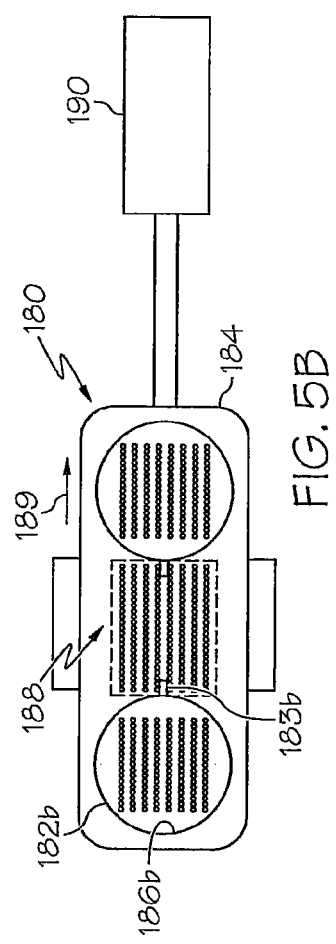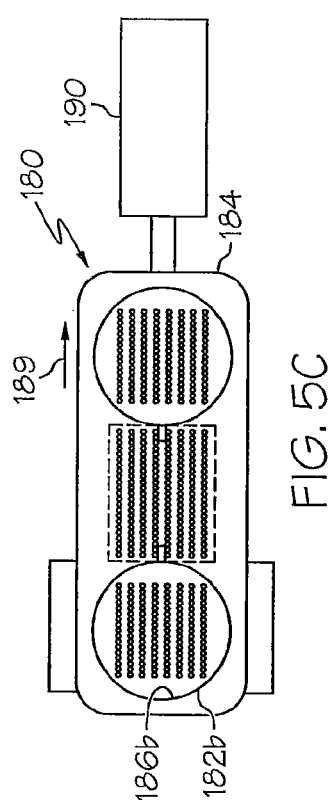

METHODS OF EXTRUDING A HONEYCOMB BODY

CROSS-REFERENCE TO RELATED APPLICATION

This application claims the benefit of priority to U.S. provisional application No. 61/265,105, filed on Nov. 30, 2009.

FIELD

The present disclosure relates generally to method of extruding a honeycomb body, and more particularly, to method of extruding a honeycomb body from batch material comprising a ceramic or ceramic-forming material.

BACKGROUND

Extruders are commonly used to produce honeycomb bodies with a honeycomb extrusion die. Mixing screws commonly mix the batch material and cause the batch material to pass through the extrusion die to form the honeycomb body. Extruders are known to include filters to help remove undesirably sized particles from the batch material. It is often desirable to change the filter and/or honeycomb extrusion die of the extruder.

SUMMARY

In one example, a method of extruding a honeycomb body with an extruder comprises the step of feeding batch material to the extruder, wherein the batch material comprises a ceramic or ceramic-forming material. The method further includes the step of rotating at least one mixing screw to cause the batch material to travel along a flow path defined by a barrel of the extruder. The batch material is pressurized within the barrel and travels through a first device held in the flow path by a carriage. The method further includes the step of indexing the carriage to remove the first device from the flow path and introduce a second device into the flow path such that the pressurized batch material thereafter travels through the second device held in the flow path by the carriage. The pressure of the batch material changes less than about 25% as a result of indexing the carriage. The method further includes the step of forming the batch material into a honeycomb body as the batch material exits the extruder.

In another example, a method of extruding a honeycomb body with an extruder comprises the step of feeding batch material to the extruder, wherein the batch material comprises a ceramic or ceramic-forming material. The method further includes the step of rotating at least one mixing screw to cause the batch material to travel along a flow path defined by a barrel of the extruder, wherein the batch material travels through a first device held in the flow path by a carriage. The method further includes the step of indexing the carriage to remove the first device from the flow path and introduce a second device into the flow path such that the batch material thereafter travels through the second device held in the flow path by the carriage. The method still further includes the steps of reducing a decrease in temperature of the batch material resulting from the step of indexing, and forming the batch material into a honeycomb body as the batch material exits the extruder.

In yet another example a method of extruding a honeycomb body with an extruder comprises the step of feeding batch material to the extruder, wherein the batch material comprises a ceramic or ceramic-forming material. The method further includes the step of rotating at least one mixing screw to cause the batch material to travel along a flow path defined by a barrel of the extruder, wherein the batch material travels through a first honeycomb extrusion die held in the flow path by a carriage. The method further includes the step of pre-filling a second honeycomb extrusion die held by the carriage with a plugging material. The method also includes the step of indexing the carriage to remove the first honeycomb extrusion die from the flow path and introduce the second pre-filled honeycomb extrusion die into the flow path such that the batch material thereafter displaces the plugging material and travels through the second device held in the flow path by the carriage. The method provides that the step of pre-filling is completed before the step of indexing begins.

BRIEF DESCRIPTION OF THE DRAWINGS

These and other features, aspects and advantages are better understood when the following detailed description is read with reference to the accompanying drawings, in which:

FIG. 4A is a cross sectional view of the extruder along line 4A-4A of FIG. 1 with a filter carriage in a first position;

FIG. 4B illustrates the filter carriage of FIG. 4A indexed to a second position;

FIG. 5A illustrates a cross sectional view of the extruder along line 5A-5A of FIG. 1 with a die carriage in a first position;

FIG. 5B illustrates a cross sectional view of the die carriage of FIG. 5A in an intermediate position;

FIG. 5C illustrates a cross sectional view of the die carriage of FIG. 5B indexed to a second position;

DETAILED DESCRIPTION

Figure 1:
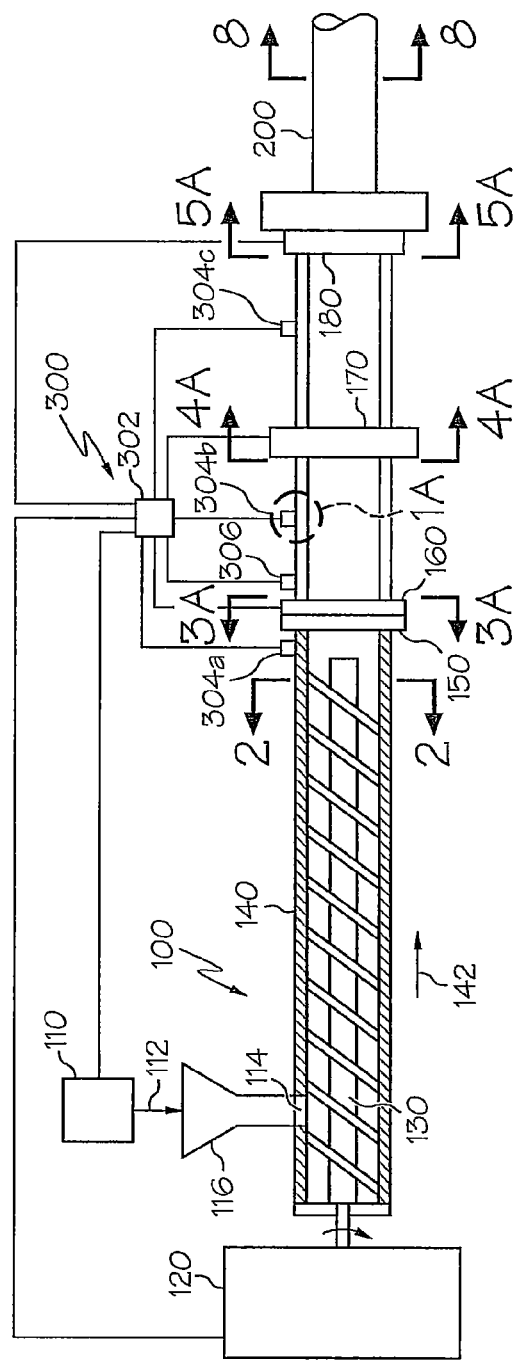
FIG. 1 is a schematic view of an example extruder for extruding a honeycomb body.

Example embodiments will now be described more fully hereinafter with reference to the accompanying drawings. Whenever possible, the same reference numerals are used throughout the drawings to refer to the same or like parts. However, the appended claims may be embodied in many different forms and should not be construed as limited to the embodiments set forth herein. These example embodiments are provided so that this disclosure will be both thorough and complete, and will fully convey the scope of the appended claims to those skilled in the art.

FIG. 1 is a schematic illustration of an example extruder 100 for extruding a honeycomb body 200. The honeycomb body 200 is extruded from batch material 112 comprising a ceramic or ceramic-forming material. The honeycomb body 200 can be processed into a cellular honeycomb article for use in exhaust catalyzing and/or filtering applications. Porous honeycomb articles can be used as a particulate filter and may include an optional catalyst layer in certain applications. Such porous honeycomb filters are useful, for example, to filter exhaust from an engine (e.g., diesel engine) before releasing the exhaust to the environment. Other examples of porous honeycomb articles can include flow-through substrates or other thin-wall bodies.

Porous honeycomb articles can comprise various materials depending on the particular application and substrate characteristics. For instance, the porous honeycomb articles can comprise cordierite, aluminum titanate, silicon carbide, mullite or other ceramic materials. In one example, porous cordierite ceramic honeycomb articles can be formed with a wide variety of batch compositions including a quantity of inorganic components. The quantity of inorganic components can include oxide sources of magnesia, alumina and silica effective to form cordierite ($Mg_2Al_4Si_5O_{18}$) upon firing. Such oxide sources can be provided, for example, by talc, alumina, aluminum hydroxides, clay, and/or silica.

Various ceramic honeycomb articles may be produced with the concepts of the present disclosure. For example, honeycomb articles can be formed with a honeycomb structure disclosed in U.S. Pat. No. 6,562,284 to Beall et al. that is herein incorporated by reference in its entirety. In one example, the honeycomb articles of the present disclosure can include cell geometries with a cell density of greater than 200 cells/in$^2$ (cpsi). In further examples, honeycomb articles of the present disclosure can include cell geometries with a cell density of greater than about 300 cpsi, such as greater than about 400 cpsi, 500 cpsi, 600 cpsi, 700 cpsi, 800 cpsi, or 900 cpsi. Furthermore, the walls forming the cells are porous and can have a wall thickness of less than 12 mil, or even less than or equal to 1 mil.

As shown in FIG. 1, the extruder 100 can include a feeder 110 configured to introduce a desired quantity of batch material 112 into a barrel 140 by way of an inlet port 114. As shown, the batch material 112 may be gravity fed by a trough 116 disposed above the barrel 140 although the batch material may be rammed, metered, or otherwise fed into the barrel 140.

Figure 2:
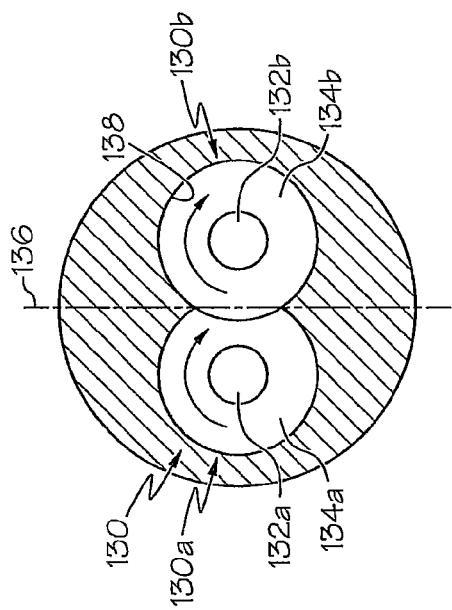
FIG. 2 is a cross sectional view of the extruder along line 2-2 of FIG. 1.

The extruder 100 further includes a motor 120 configured to rotate at least one mixing screw 130 to cause the batch material 112 to travel along a flow path 142 defined by the barrel 140. As shown in FIG. 2, at least one mixing screw 130 can comprise a first mixing screw 130a and a second mixing screw 130b although a single mixing screw or more than two mixing screws may be provided in further examples. As shown, each mixing screw 130a, 130b can include respective shafts 132a, 132b disposed substantially parallel to one another along the flow path 142. Moreover, each mixing screw 130a, 130b, may have respective screw threads 134a, 134b helically wound around and extending from the corresponding shafts 132a, 132b. As shown, the shafts 132a, 132b can be mounted such that the corresponding threads 134a, 134b mesh together along a vertical axis 136 bisecting the barrel interior 138.

Figure 3A:
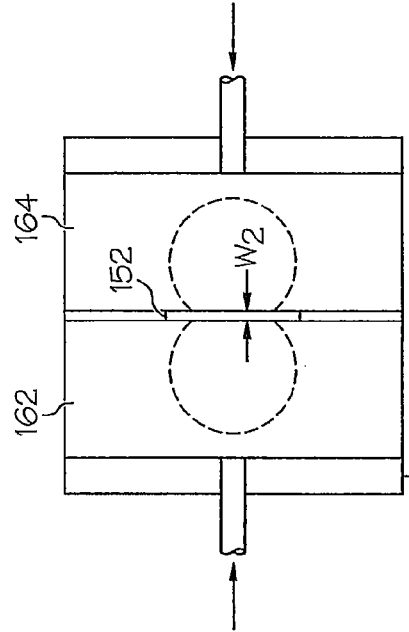
FIG. 3A is a cross sectional view of the extruder along line 3A-3A of FIG. 1.

Example extruders may include a flow device 160 for modifying the flow path of the batch material moving off the ends of the mixing screws 130a, 130b. For example, as shown in FIG. 3A, a static plate 150 may be mounted downstream from the ends of the mixing screws 130a, 130b. The batch material 112 is thereafter forced to pass through a vertical slot 152 of the static plate 150 disposed along the vertical axis 136 bisecting the barrel interior 138. The size and shape of the vertical slot may be changed in a wide variety of ways. Modifying the size and or shape of the vertical slot 152 can provide the batch material 112 with different flow profiles and/or change the pressure profile of the batch material 112 within the barrel 140.

The flow device 160, if provided, can include a restricting configuration configured to reduce the effective size of the vertical slot 152. For example, as shown, the flow device 160 can include a pair of sliding shutters 162, 164 configured to move from the position illustrated in FIG. 3A to the position illustrated in FIG. 3B. Therefore, in the illustrated embodiment, the effective width of the slot can be reduced from the width "$W_1$" illustrated in FIG. 3A to the width "$W_2$" illustrated in FIG. 3B.

In one example, the size and shape of vertical slot 152 is selected to provide a desired slot 152 cross-sectional area ($A_{SLOT}$) with respect to the barrel 140 cross-sectional area ($A_{BARREL}$). The cross-sectional area of the barrel 140 is calculated without the screws 130a, 130b in the barrel. In one embodiment, the size and shape of the slot 152 is selected such that the ratio of $A_{BARREL}/A_{SLOT}$ is in range from about 20 to about 40 (i.e., $20 \leq A_{BARREL}/A_{SLOT} \leq 40$). For a given flow rate of the batch material 112 through the barrel 140, changing $A_{SLOT}$ will alter the velocity of the batch material 112 flowing through the slot 152, with the velocity of the batch material 112 increasing as $A_{SLOT}$ decreases. In one example $A_{SLOT}$ is selected in combination with a flow rate of batch material 112 to provide a desired velocity of the batch material 112 flowing through the slot 152. In one embodiment, $A_{SLOT}$ and the flow rate of the batch material 112 are selected such that the velocity of the batch material flowing through the slot 152 is in the range from about 4 inches/second to about 8 inches/second. In other embodiments in which the batch material 112 has less sensitivity to flow rate (such as for honeycombs having relatively thick walls, e.g., greater than about 10 μm), the batch material flowing through the slot 152 may have a velocity of up to about 16 inches/second.

Figure 3B:
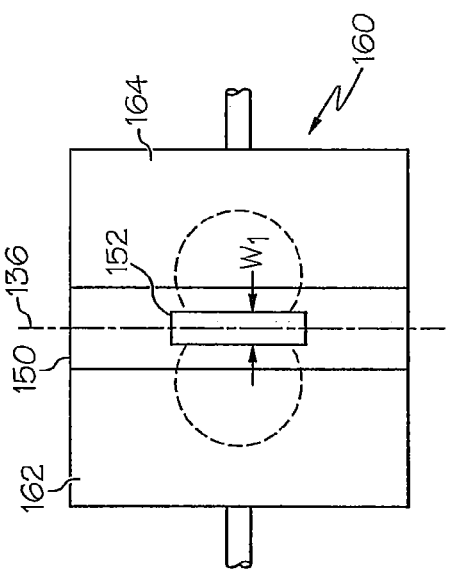
FIG. 3B is the cross sectional view of FIG. 3A with a shutter mechanism restricting a flow opening.
Figure 9A:
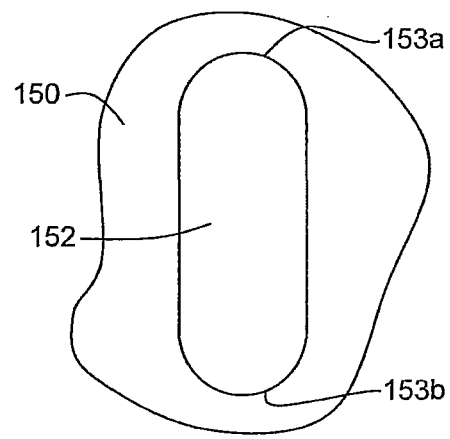
FIG. 9A illustrates a static plate having a generally rectangular slot with curved end portions.

As schematically illustrated in FIG. 3A and FIG. 3B, in one example, slot 152 of the static plate 150 is disposed along the vertical axis 136 bisecting the barrel interior 138 and has a generally rectangular shape. In one example, as schematically illustrated in FIG. 9A, the generally rectangular shape of slot 152 is provided with a curved or arced profile at the upper end 153a and lower end 153b of slot 152. In one embodiment, the curved profile at upper and lower ends 153a, 153b is semicircular, although in other embodiments curved profiles other than semicircular profiles may be desired to impart a different flow profile and/or pressure profile to the batch material 112.

Figure 9B:
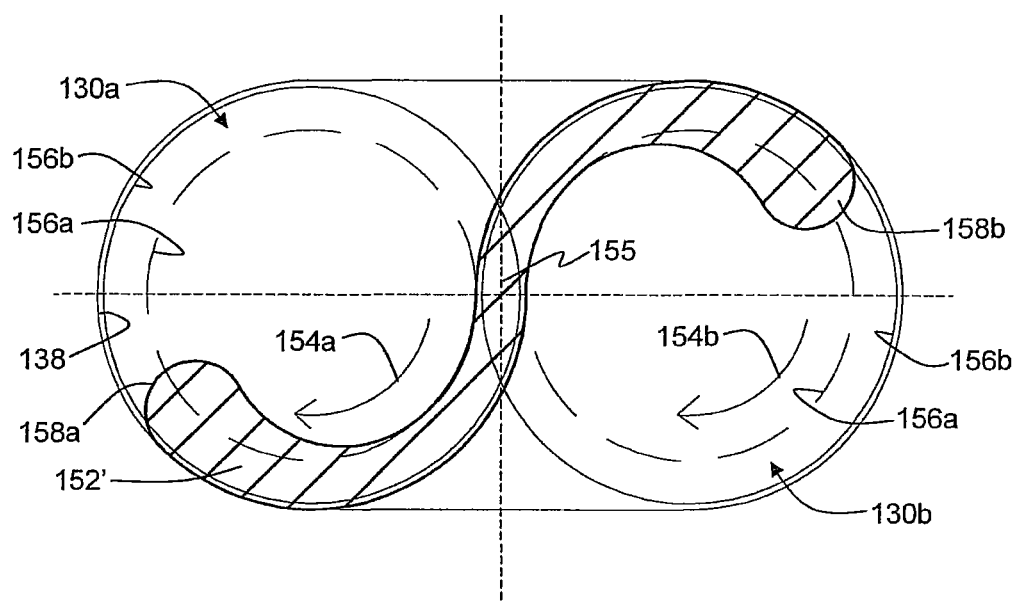
FIG. 9B illustrates a static plate having an S-shaped slot.

In other embodiments, static plate 150 is provided with an opening having a shape other than a generally rectangular shape. As schematically illustrated in FIG. 9B, the opening in static plate 150 may be generally "S" shaped, such that S-shaped slot 152' curls around portions of the two mixing screws 130a, 130b (rotating in the directions of arrows 154a, 154b, respectively). In one embodiment, S-shaped slot 152' curls around portions of mixing screws 130a, 130b in the intermeshed region 155 and regions of the screws 130a, 130b that are rotating away from the intermeshed region 155, such that portions of the screws 130a, 130b that are rotating towards the intermeshed region 155 are blocked by static plate 150. This configuration of S-shaped slot 152' has the effect of improving mixing of batch mixture 112 by impeding the areas of highest flow rate of batch mixture 112. In one example, the S-shaped slot 152' covers more than about 90° of each screw 130a, 130b. In one example, the width of S-shaped slot 152' extends from about the root diameter 156a to about the crest diameter 156b of the screws 130a, 130b. In one example, at least end portions 158a, 158b of S-shaped slot 152' are larger than the width as determined by the root and crest diameters 156a, 156b of the screws 130a, 130b.

As shown in FIG. 4A, the extruder 100 can include a filter assembly 170 positioned upstream from a honeycomb extrusion die assembly 180. The filter assembly 170 can be provided with at least one filter 172a configured to remove oversized particles from the batch material 112. As shown, the filter assembly 170 can also be provided for quickly changing the filter once the filter is loaded, damaged or otherwise needs to be changed. As shown in FIG. 4A, the filter assembly 170 can include a filter carriage 174 with a first seat 176a and a second seat 176b. The first seat 176a may include a countersunk recess configured to receive and restrain the first filter 172a therein. Likewise, the second seat 176b may include a similar countersunk recess configured to receive and restrain the second filter 172b therein. In further examples, two or more filters may be placed within the same recess. For example, as shown, an additional filter 172c may be placed in series with the second filter 172b. Providing two or more filters in series can allow adjustment of the pressure of the batch material upstream of the filter assembly 170 as discussed more fully below. Still further, rather than two or more filters, a single filter with a more restrictive hole pattern may be used to provide the desired pressure adjustment for the batch material.

As shown in FIGS. 4A and 4B, an actuating mechanism 178 can be provided to index the filter carriage 174 from the first position illustrated in FIG. 4A to a second position illustrated in FIG. 4B. In the first position shown in FIG. 4A, the first filter 172a is positioned within the flow path of the batch material 112 wherein oversized particles are filtered out of the batch material 112. As shown in FIG. 4B, the first filter 172a is removed from the flow path while the second filter 172b is positioned within the flow path to thereafter continue filtering the batch material 112. The first filter 172a can then be cleaned and/or replaced to prepare for the next indexing procedure.

Figure 8:
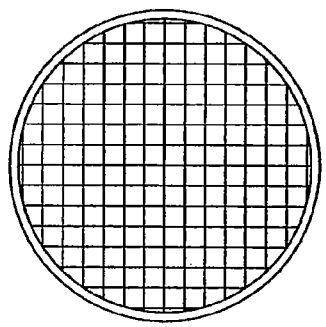
FIG. 8 is a cross sectional view of an extruded honeycomb body of batch material comprising a ceramic or ceramic-forming material.
Figure 6:
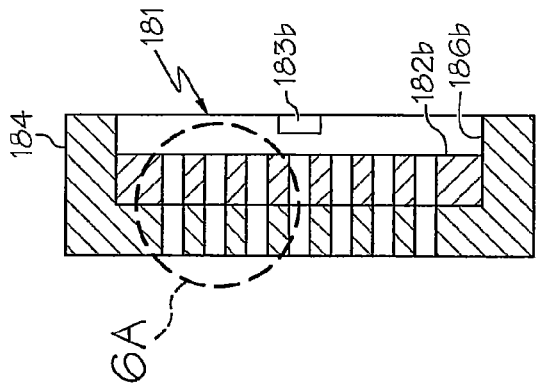
FIG. 6 is a cross sectional view of the die carriage along line 6-6 of FIG. 5A.

As shown in FIG. 5A the extruder 100 includes a honeycomb extrusion die assembly 180. As schematically illustrated, the honeycomb extrusion die assembly 180 can be provided with at least one honeycomb extrusion die 182a configured to extrude the honeycomb body 200 illustrated in FIG. 8. The honeycomb extrusion die assembly 180 can be provided for quickly changing the honeycomb extrusion die 182a once the die becomes clogged, damaged or otherwise needs to be changed. As shown in FIG. 5A, the honeycomb extrusion die assembly 180 can include a die carriage 184 with a first seat 186a and a second seat 186b. The first seat 186a may include a countersunk recess configured to receive and restrain the first honeycomb extrusion die 182a therein. Likewise, the second seat 186b may include a similar countersunk recess configured to receive and restrain the second honeycomb extrusion die 182b therein. By way of example, FIG. 6 shows examples of the countersunk recess and honeycomb extrusion die configuration.

As shown in FIGS. 5A-5C, an actuating mechanism 190 can be provided to index the die carriage 184 from the first position illustrated in FIG. 5A to a second position illustrated in FIG. 5C. In the first position shown in FIG. 5A, the first honeycomb extrusion die 182a is positioned within the flow path of the batch material 112 to extrude the honeycomb body 200. As shown in FIG. 5C, the first honeycomb extrusion die 182a is removed from the flow path while the second honeycomb extrusion die 182b is indexed to be positioned within the flow path to thereafter continue extruding the honeycomb body 200 from the batch material 112. The first honeycomb extrusion die 182a can then be cleaned and/or replaced to prepare for the next indexing procedure.

Figure 7:
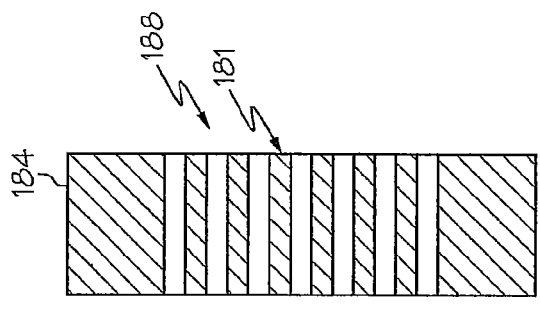
FIG. 7 is a cross sectional view of the die carriage along line 7-7 of FIG. 5A.

As further illustrated in FIGS. 5A-5C, the die carriage 184 can include a pattern of apertures 188 that can be formed in a portion of the die carriage 184 between the first seat 186a and the second seat 186b. As apparent in FIGS. 5A, 6 and 7, the apertures can be formed along a substantially planar surface 181 between the first countersunk recess of the first seat 186a and the second countersunk recess of the second seat 186b. Thus, as shown, the carriage can be arranged with the pattern of apertures 188 extending along the substantially planar surface 181 between the first recess and the second recess so the first honeycomb extrusion die 182a is countersunk with respect to the substantially planar surface 181 and the second honeycomb extrusion die 182b is also similarly countersunk with respect to the substantially planar surface 181. Optionally, the portion (e.g., substantially planar surface 181) including the pattern of apertures 188 can include one or more fill channels 183a, 183b. The fill channels 183a, 183b can be configured to allow at least partial filling of the countersunk recess and/or corresponding honeycomb extrusion die before the die carriage 184 is completely indexed between the first position and the second position.

Referring back to FIG. 1, the extruder 100 can further include a control system 300 that may be configured to facilitate certain process techniques. As shown in the control system 300 can include a computer controller 302 operably connected to the feeder 110 to control the feed rate of the batch material 112 into the inlet 114. The computer controller 302 can also be operably connected to the flow device 160, the filter assembly 170 and/or the honeycomb extrusion die assembly 180.

Figure 1A:
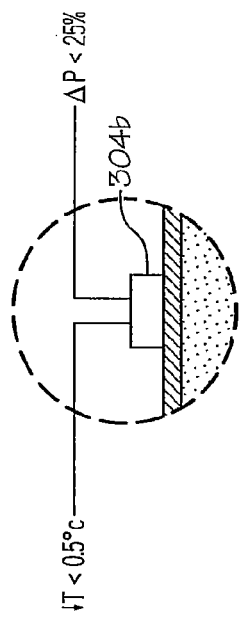
FIG. 1A is an enlarged view of a portion of the extruder of FIG. 1.

The control system 300 can also include one or more sensors to measure temperature, pressure or other batch material characteristics. For instance, as schematically illustrated a first sensor 304a can be positioned upstream from the static plate 150, a second sensor 304b can be positioned upstream from the filter assembly 170 and a third sensor 304c can be positioned upstream from the honeycomb extrusion die assembly 180. Although three sensors are illustrated, more or less sensors may be provided at the same or alternative positions along the extruder 100. As schematically illustrated in FIG. 1A, each of the sensors (e.g., 304a, 304b, 304c) can measure various batch material pressures and can provide feedback to detect when the pressure of the batch material changes, for example, less than about 25% as a result of a process technique. In addition or alternatively, as further illustrated, each of the sensors can measure various batch material temperatures and can provide feedback to detect when the temperature of the batch material is reduced, for example, less than about 0.5° C. as a result of a process technique.

As further illustrated, the control system 300 can also include one or more chillers 306 to reduce the temperature of the batch material 112 being worked by the mixing screws. The chillers 306 can also be configured to reduce a decrease in temperature of the batch material 112 within the barrel. For example, the set point of the chillers can be set to a higher temperature to counteract a temperature reduction that may occur as a result of a process technique. As shown, the chillers 306 may be operably connected to the computer controller 302 and may be located at one or more positions along the extruder 100 to control the chilling effect of the batch at various positions as the batch passes through the extruder 100.

Methods of extruding the honeycomb body 200 with example extruders 100 will now be described. As shown, the computer controller 302 can send a signal to the feeder 110 to begin dispensing an appropriate quantity of batch material 112 into the inlet port 114 of the extruder. The computer controller 302 can also send an appropriate signal to the motor 120 to cause the at least one mixing screw 130, such as the illustrated first and second mixing screws 130a, 130b, to rotate about their respective shafts 132a, 132b. As shown, in FIG. 2, the mixing screws 130a, 130b rotate in opposite directions although the mixing screws may rotate in the same direction in further examples.

As shown, rotation of the mixing screws cause the batch material 112 to travel along the flow path 142 defined by the barrel 140 of the extruder. The batch material 112 can also be further mixed and processed to provide a desired consistency. Moreover, various conditions of the extruder 100 cause the batch material to become pressurized within barrel 140. The batch material may include a mean pressure of 4,500 psi although other operating pressures may be provided in further examples. Such pressures can result from various sources including the feed rate of batch material 112 by the feeder 110, the rotational rate of the at least one mixing screw 130 and further processing devices positioned downstream from the at least one mixing screw 130. For example, the optional static plate 150 can provide a fluid flow restriction as all of the batch material 112 is forced to pass through the vertical slot 152. Moreover, the flow device 160 may be adjusted to reduce the width of the vertical slot 152, thereby increasing the pressure of the batch material upstream of the static plate 150. Moreover, the filter assembly 170 can provide resistance to batch flowing through the filter assembly as the batch material 112 is being filtered by the at least one filter 172a, 172b, 172c. Thus, resistance from the filters can increase the batch pressure at a position upstream from the filter assembly 170. Still further, the honeycomb extrusion die assembly 180 can provide resistance to batch flow, thereby increasing the pressure of the batch material upstream of the honeycomb extrusion die assembly 180.

In one example, the batch material 112 can then travel through the vertical slot 152 of the static plate 150. Forcing the batch material 112 to travel through the vertical slot 152 can remove cross sectional inconsistencies where the batch material 112 fills in an area no longer displaced by the mixing screws.

The pressurized batch material 112 eventually travels through a first device held in the flow path 142 by a carriage. In one example, the carriage comprises the filter carriage 174 positioned upstream from the honeycomb extrusion die. In this example, the first device comprises the first filter 172a and a second device comprises the second filter 172b. In this arrangement, the batch material 112 is pressurized within the barrel 140 and travels through the first filter 172a held in the flow path 142 by the filter carriage 174. As such, oversized particles are filtered out of the batch material 112 by the first filter 172a. The batch material then passes through the honeycomb extrusion die assembly 180 to form the honeycomb body 200 as the batch material 112 exits the extruder 100.

Once the filter becomes loaded, damaged, or otherwise needs to be changed, the actuating mechanism 178 can be activated either manually or by way of the computer controller 302. As shown in FIG. 4B, the filter carriage 174 can then be indexed to remove the first filter 172a from the flow path 142 and introduce a second filter 172b into the flow path 142 such that the pressurized batch material 112 thereafter travels through the second filter 172b held in the flow path 142 by the filter carriage 174. The extruder 100 can be designed to reduce any change in the pressure of the batch material 112 to less than about 25% as a result of indexing the filter carriage 174. In another example, the pressure of the batch material changes less than about 15%, such as less than about 10%, as a result of indexing the filter carriage 174.

Reducing any change in pressure due to indexing of the filter carriage 174 can be accomplished in a number of ways. For example, just before, during and/or after indexing the filter carriage 174, the flow device 160 may be activated to temporarily restrict the flow path upstream of the filter carriage 174 to control the pressure of the batch material during the step of indexing the filter carriage 174. As shown in FIG. 3B, for example, a pair of shutters 162, 164 may reduce the effective width of the vertical slot 152 from "$W_1$" to "$W_2$". As such, the pressure of the batch material 112 upstream of the static plate 150 may temporarily rise to counteract any reduction of pressure resulting from indexing of the filter carriage 174. Once the second filter 172b is appropriately positioned within the flow path 142, the flow device 160 may then be activated to reposition the shutters 162, 164 to eventually restore the vertical slot 152 to its original operating width "$W_1$".

As mentioned previously, after passing through the static plate 150, the pressurized batch material 112 eventually travels through a first device held in the flow path 142 by a carriage. As stated above, the carriage can comprise the filter carriage 174 and the devices can comprise filters. In addition or alternatively, the carriage can comprise the die carriage 184 wherein the first device comprises the first honeycomb extrusion die 182a, and the second device comprises the second honeycomb extrusion die 182b. In such an example, the batch material may pass through the filter assembly 170 and then pass through the honeycomb extrusion die assembly 180 to form the batch material 112 into the honeycomb body 200 as the batch material exits the extruder 100.

In one example, the batch material 112 is pressurized within the barrel 140 and travels through the first honeycomb extrusion die 182a held in the flow path 142 by the die carriage 184. Once the first honeycomb extrusion die 182a becomes clogged, damaged or otherwise needs changed, the actuating mechanism 190 can be activated either manually or by way of the computer controller 302. As shown in FIGS. 5B-5C, the die carriage 184 can then be indexed to remove the first honeycomb extrusion die 182a from the flow path 142 and introduce the second honeycomb extrusion die 182b into the flow path 142 such that the pressurized batch material 112 thereafter travels through the second honeycomb extrusion die 182b held in the flow path by the carriage. The extruder 100 can be designed to reduce any change in the pressure of the batch material 112 to less than about 25% as a result of indexing the die carriage 184. In another example, the pressure of the batch material changes less than about 15%, such as less than about 10%, as a result of indexing the filter carriage 174.

Reducing any change in pressure due to indexing the die carriage 184 can be achieved in a wide variety of ways. For example, as similarly discussed above, just before, during and/or after indexing the die carriage 184, the flow device 160 may be activated to temporarily restrict the flow path upstream of the die carriage 184 to control the pressure of the batch material during the step of indexing the die carriage 184. In addition, or alternatively, the die carriage 184 can include a pattern of apertures 188 that may be temporarily positioned within the flow path 142, such as slowly moved across the flow path, as shown in FIG. 5B, when indexing the die carriage 184 from the first position shown in FIG. 5A to the second position shown in FIG. 5B. As such, any pressure spike that may otherwise result from complete cut off of batch material flow would be reduced since flow can be maintained through the pattern of apertures 188 during the die carriage indexing procedure. In one example, the pattern of apertures does not produce a honeycomb structure but is simply designed to provide a pressure release to reduce any resulting pressure spike from the indexing procedure. Accordingly, a honeycomb body 200 may be produced when the first honeycomb extrusion die 182a is positioned within the flow path 142 as illustrated in FIG. 5A. Likewise, a honeycomb body 200 may be produced when the second honeycomb extrusion die 182b is positioned within the flow path 142 as shown in FIG. 5C.

Referring to FIG. 6, it will be appreciated that the countersunk area of the first seat 186a and corresponding honeycomb extrusion die 182a are filled with batch material 112 before the indexing procedure begins. As the indexing procedure begins, the pattern of apertures 188 begins to be placed in communication with the flow path 142. Moreover, as the pattern of apertures may be disposed on along a substantially planar surface 181, no countersunk recess needs to be filled, thereby minimizing the pressure impact within the batch material when indexing from the first position to the transition position the pattern of apertures 188 are brought into communication with the flow path 142.

As the indexing continues, the fill channel 133b, if provided, may allow at least some prefilling of the countersunk area of the second seat 186b and corresponding honeycomb extrusion die 182b. Therefore, the countersunk area and the honeycomb extrusion die can be gradually filled during the transition portion of indexing to minimize the pressure impact within the batch material when indexing from the transition position to the second position illustrated in FIG. 5C. Likewise, the fill channel 133a can facilitate prefilling of the countersunk area associated with the first seat 186a and the first honeycomb extrusion die 182a when indexing the die carriage 184 back to the position illustrated in FIG. 5A.

The indexing procedure illustrated in FIGS. 5A-5C can be performed as a substantially continuous movement from beginning to end although the indexing procedure may be performed with noncontinuous movements, e.g., a series of stepped procedures. Moreover, as indicated by the identical velocity vector 189 in FIGS. 5A, 5B, 5C, the velocity of the die carriage 184 may be substantially the same from beginning to end although alternating velocities may be provided in further examples. The step of indexing can occur during various periods of time. For example, the step of indexing the die carriage 184 with the pattern of apertures can be completed within a range of from about 5 seconds to about 90 seconds.

In addition or alternatively, one may reduce the pressure change to indexing the die carriage 184 by increasing a flow resistance of a filter located upstream of the die carriage 184 to control the pressure of the batch material 112 during the step of indexing. For example, as shown in FIG. 4A, two or more filters 172b, 172c may be placed in series within the same second seat 176b. Providing two or more filters in series can allow adjustment of the pressure of the batch material upstream of the filter assembly 170. In addition or alternatively, one filter may be provided with a more restrictive hole pattern to provide the desired pressure adjustment for the batch material. Thus, just prior to, during, and/or after indexing the die carriage 184, the filter carriage 174 may be indexed to place the more restrictive filter assembly in the flow path 142, thereby reducing the impact of a pressure drop that may otherwise result from indexing the die carriage 184.

Figure 6A:
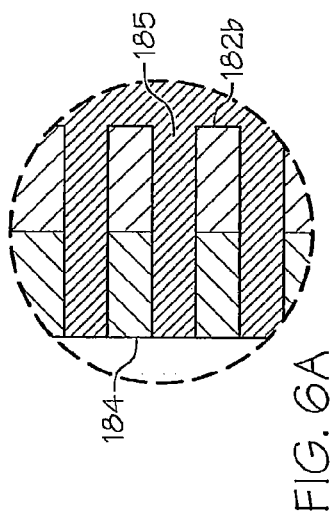
FIG. 6A is an enlarged view of the die carriage of FIG. 6 wherein the honeycomb extrusion die is optionally pre-filled with a plugging material.

In further examples, adverse pressure impacts may be avoided by pre-filling the second honeycomb extrusion die 182b and/or the pattern of apertures 188. For example, as shown in FIG. 6A, a plugging material 185 may fill the countersunk recess associated with the second seat 186b and can also fill the second honeycomb extrusion die 182b. In still further examples, plugging material may also fill the pattern of apertures 188. Various plugging materials may be used such as wax, gelatin or other plugging material that would be easily displaced by the batch material. Moreover, the plugging material may comprise batch material or other material simulating properties of the batch material. The step of pre-filling can be completed before the step of indexing begins. Thus, it is possible to pre-fill without use of material within the barrel during indexing to avoid adverse impact on the pressure of the batch material. Once the step of pre-filling is complete, the die carriage 184 may be indexed to place the pre-filled pattern of apertures and/or the honeycomb extrusion die in the flow path. As a result of being prefilled, pressure drops are avoided that might otherwise occur by immediately placing the empty pattern of apertures, the empty countersunk recess and/or the empty honeycomb extrusion die in the flow path.

In addition or alternative to each of the methods disclosed above, the method may include reducing a decrease in temperature of the batch material 112 as a result of indexing the die carriage 184 and/or the filter carriage 174. In one example, the temperature of the batch material 112 is reduced less than about 0.5° C., such as less than about 0.3° C., as a result of the step of indexing. Reducing a decrease in the temperature of the batch material 112 can be achieved in a wide variety of ways. For example, before, during or after indexing the die carriage and/or the filter carriage, the computer controller 302 can send a signal to the feeder 110 to increase the feed rate of the batch material 112 to the extruder. In such an example, the rotation rate of the at least one mixing screw 130 may be maintained substantially constant during the step of increasing the feed rate. In further examples, the rotation rate may change depending on the change in feed rate of the material 112 to further control the temperature characteristics.

In still further examples, reducing a decrease in the temperature of the batch material 112 can be achieved by raising the temperature set point of the chillers 306 associated with the barrel 140. For example, as shown, the computer controller 302 may send a signal to raise the temperature set point of the chillers 306 to counteract a decrease in the temperature of the batch material 112.

Various aspects described above can be beneficial, for example, to counteract a pressure and/or temperature upset in the extruder when changing the filter or honeycomb extrusion die. Such counteraction can reduce or prevent a perturbation to the homogeneity of the batch material otherwise resulting from a pressure and/or temperature upset. Consequently, various aspects set forth above can reduce or prevent inhomogeneous material flow through the honeycomb extrusion die, thereby avoiding a non-uniform flow from web to adjacent web that would result in deformation of the delicate honeycomb structure. Furthermore, counteracting the pressure and/or temperature upset can enhance production efficiency and reduce material waste. Indeed, the batch material will be able to quickly reach equilibrium conditions for producing acceptable honeycomb bodies upon changing the filter or honeycomb extrusion die. Without counteraction, a relatively long run time would be needed to allow the batch material to reach the same equilibrium conditions.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method of extruding a honeycomb body with an extruder comprising the steps of:
    feeding batch material to the extruder, wherein the batch material comprises a ceramic or ceramic-forming material;
    rotating at least one mixing screw to cause the batch material to travel along a flow path defined by a barrel of the extruder, wherein the batch material is pressurized within the barrel and travels through a first device held in the flow path by a carriage;
    indexing the carriage to remove the first device from the flow path and introduce a second device into the flow path such that the pressurized batch material thereafter travels through the second device held in the flow path by the carriage, wherein a feature of the extruder is adjusted such that the pressure of the batch material changes less than about 25% as a result of indexing the carriage, wherein adjusting the feature is selected from the group consisting of: adjusting a filter upstream from the carriage; restricting a flow path upstream of the carriage; placing a pattern of apertures between the first device and the second device in communication with the flow path while indexing the carriage; and prefilling the first device, the second device, and or a pattern of apertures with the batch material prior to beginning the step of indexing the carriage; and
    forming the batch material into a honeycomb body as the batch material exits the extruder.

2. The method of claim 1, wherein the pressure of the batch material changes less than about 15% as a result of indexing the carriage.

3. The method of claim 2, wherein the pressure of the batch material changes less than about 10% as a result of indexing the carriage.

4. The method of claim 1, wherein the carriage is positioned upstream from a honeycomb extrusion die, the first device comprises a first filter and the second device comprises a second filter and wherein adjusting the feature comprises modifying the size and or shape of the slot upstream from the carriage.

5. The method of claim 1, wherein the first device comprises a first honeycomb extrusion die and the second device comprises a second honeycomb extrusion die.

6. The method of claim 5, wherein the carriage includes a pattern of apertures that is temporarily positioned within the flow path during the step of indexing the carriage, wherein the adjusting the feature comprises placing the pattern of apertures in communication with the flow path while indexing the carriage.

7. The method of claim 6, wherein the carriage includes a first recess receiving the first honeycomb extrusion die and a second recess receiving the second honeycomb extrusion die, and the pattern of apertures is formed in a portion of the carriage between the first recess and the second recess.

8. The method of claim 7, wherein the portion of the carriage including the pattern of apertures extends along a substantially planar surface between the first recess and the second recess, the first honeycomb extrusion die is countersunk with respect to the substantially planar surface, and the second honeycomb extrusion die is countersunk with respect to the substantially planar surface.

9. The method of claim 5, wherein a flow resistance provided by a filter located upstream of the carriage is increased to control the pressure of the batch material during the step of indexing, wherein the adjusting the feature comprises adjusting the filter upstream from the carriage by increasing the flow resistance of the filter.

10. The method of claim 5, wherein the step of indexing is completed within a range from about 5 seconds to about 90 seconds.

11. The method of claim 5, wherein the step of indexing is performed as a substantially continuous movement.

12. The method of claim 1, wherein a temperature of the batch material is reduced less than about 0.5° C. as a result of the step of indexing.

13. The method of claim 12, wherein the temperature of the batch material is reduced less than about 0.3° C. as a result of the step of indexing.

14. The method of claim 1, wherein the adjusting the feature comprises restricting the flow path upstream of the carriage by modifying the size and or shape of a slot upstream from the carriage to control the pressure of the batch material during the step of indexing.

15. A method of extruding a honeycomb body with an extruder comprising the steps of:
    feeding batch material to the extruder, wherein the batch material comprises a ceramic or ceramic-forming material;
    rotating at least one mixing screw to cause the batch material to travel along a flow path defined by a barrel of the extruder, wherein the batch material travels through a first honeycomb extrusion die held in the flow path by a carriage;
    pre-filling a second honeycomb extrusion die held by the carriage with a plugging material; and
    indexing the carriage to remove the first honeycomb extrusion die from the flow path and introduce the second pre-filled honeycomb extrusion die into the flow path such that the batch material thereafter displaces the plugging material and travels through the second device held in the flow path by the carriage,
    wherein the step of pre-filling is completed before the step of indexing begins.

* * * * *